United States Patent [19]
Okano

[11] 3,894,702
[45] July 15, 1975

[54] REEL DRIVE DISC DEVICE IN A RECORDING AND/OR REPRODUCING APPARATUS

[75] Inventor: Takeshi Okano, Yokohama, Japan

[73] Assignee: Victor Company of Japan, Ltd., Yokohama, Japan

[22] Filed: Dec. 26, 1973

[21] Appl. No.: 427,668

[30] Foreign Application Priority Data

Dec. 25, 1973 Japan .................................. 49-2407
Dec. 25, 1973 Japan .................................. 49-2408
Dec. 25, 1973 Japan .................................. 49-2409

[52] U.S. Cl. .................................. 242/201; 242/208
[51] Int. Cl. .......................... G03b 1/04; G11b 15/32
[58] Field of Search ............................ 242/198–208; 192/107 R, 107 M, 125 R

[56] References Cited

UNITED STATES PATENTS 3,085,758 4/1963 Herrmann et al. .................. 242/201
3,493,193 2/1970 Crandall et al. .................... 242/203
3,529,789 9/1970 Morgan .............................. 242/201

*Primary Examiner*—Leonard D. Christian

[57] ABSTRACT

A reel drive disc device has a sliding friction clutch for transmitting output power, at constant rotational speed and with a desired torque, to a reel-supporting disc which is rotated at a speed that varies in accordance with the diameter of the tape roll wound thereon. This sliding friction clutch operates responsive to a pressing together of a felt friction member and a member made of a highly wear-resistant resin such as a polyethylene terephthalate resin. Its power transmitting torque is maintained substantially constant over a long period.

8 Claims, 9 Drawing Figures

REEL DRIVE DISC DEVICE IN A RECORDING AND/OR REPRODUCING APPARATUS

BACKGROUND OF THE INVENTION

The present invention relates to a reel drive disc device for use in a recording and/or reproducing apparatus and more particularly to a clutch for such a reel drive disc device, for transmitting power at constant rotational speed, from a driving disc to a reel-supporting disc.

More specifically, the invention relates to a reel disc device, of the type referred to above, in which a sliding friction clutch of a take-up reel disc device is operated particularly at the time of recording/reproducing. The clutch has a felt friction member and a member made of a highly wear-resistant material such as a polyethylene terephthalate, which members are adapted to be pressed together. As a result, seizure of the members in the clutch mechanism is suppressed. Even when the recording/reproducing apparatus is operated over a long total running time, the torque transmitted to the reel-supporting disc is sustained at substantially the same value as that at the initial period of the operation.

In general, in a recording/reproducing apparatus, the take-up reel rotates at a rotational speed which differs continuously as a function of the diameter of the tape roll being wound thereon. This requires the continual imparting thereto of a substantially constant tape winding torque for taking up a magnetic tape continuously paid out from a tape driving mechanism. For this purpose, the take-up reel drive disc device comprises essentially a reel-supporting disc for mounting the take-up reel thereon, a driving disc driven by a roller pressed thereagainst, and a sliding clutch mechanism between the two discs to transmit power from the driving disc to the reel-supporting disc as rotation of constant torque.

Furthermore, in a conventional audio signal reel drive disc device of this character, the reel supporting disc and the driving disc are fabricated from a molded phenolic resin. As a result, the clutch mechanism comprises a felt friction member which is pressed directly by these phenolic resin discs. In an audio signal recording/reproducing apparatus, the tape travel path is simple. The width of the tape used is narrow, whereby the weight of the wound tape roll is relatively light. For this reason, a tape winding torque applied to the reel-supporting disc of the take-up reel disc device may be in the order of 100 gram cemtimeter.

In an open-reel type video signal recording/reproducing apparatus, the magnetic tape travels through a complicated path including a part where it is in wrapping contact over a specific angle of a guide drum. Moreover, this tape generally has a width of ½ inch. Consequently, the weight of the wound roll of video signal tape is relatively heavy. For this reason, a higher tape winding torque is required for driving the take-up reel-supporting disc, as compared to the torque required in an audio signal recording/reproducing apparatus. For video tape a torque value of approximately 200 to 300 gr.cm. is sufficient.

Therefore, in the various recording/reproducing apparatus mentioned above, the take-up reel drive disc device of the above described arrangement is ample. Even after long years of use, there are very few instances of seizure in the sliding clutch mechanism. The tape winding torque applied to the reel-supporting disc is maintained at substantially the initial value.

In the video signal recording/reproducing apparatus (hereinafter referred to as VTR apparatus) of the cassette type, however, a tape winding torque of approximately 600 gr.cm is ordinarily required for driving the reel-supporting (upper) disc of the take-up reel disc device. The reasons for this high torque include such things as the increased weight of the wound tape roll due to the use of a cassette tape of ¾-inch width, the complication of the tape travel path at the time of recording/reproducing, and the action of forming the wound tape roll in contact with the inner wall surface of the cassette case. That is, the tape-winding torque in the reel disc device of the VTR apparatus of the cassette type becomes several times the torque in the above mentioned audio signal tape recorder and open-reel type VTR apparatus. For this reason, the take-up reel disc of the cassette type VTR apparatus requires a much greater sliding clutch force for pressing together the driving structure and the driven structure, as compared to the reel drive disc devices of ordinary tape recorders and open-reel VTR apparatus.

For this reason, a reel drive disc device of the above described organization is applied directly to the take-up reel disc device of a cassette type VTR apparatus. Then a seizing phenomenon (as described hereinafter) occurs between the felt material and the phenolic resin disc which slide relative to each other at the time of operation. When the cumulative operational time exceeds approximately 600 hours, the seizing phenomenon becomes intense, and the torque transmitted to the upper disc increases abruptly.

Furthermore, when the upper and lower discs are fabricated from iron, stainless steel, or glass, only the felt material wears rapidly since the disc surface is harder than the felt. Deleterious changes such as solidification occur on the felt surface. As a result, the seizing phenomenon occurs in an extremely short time in the clutch mechanism. This failure time is much shorter for iron, steel or glass than for a phenolic resin disc, whereby the torque transmitted to the upper disc increases abruptly.

When this condition occurs in a recording/reproducing apparatus of the type wherein the take-up reel disc device is driven even during loading operation, the magnetic tape resistance to travel becomes greatly excessive. It becomes impossible to carry out normal loading operation which comprises drawing the tape cut of the cassette and placing it in a prescribed tape path. Furthermore, in an apparatus of the type wherein the take-up reel disc device is driven upon completion of the loading operation, the tape is immediately taken up with a great winding force when the loading means moves to the terminal position.

Consequently, the loading means becomes coercively unlocked from its locked state in the correct loading completion position. The loading means is moved toward its disengaged position, and the loading operation is unintentionally terminated. If the apparatus is set in the recording/reproducing mode and the tape travels along a prescribed tape path, the tension applied to the tape becomes abnormally high. Normal recording/reproducing operation is not carried out. Still another problem caused by this high tension applied to the tape is that it gives rise to deterioration, damage, and other defects in the tape.

SUMMARY OF THE INVENTION

Accordingly, it is a general object of the present invention to provide a novel and useful reel drive disc device in a recording/reproducing apparatus in which the above described difficulties have been overcome.

A specific object of the invention is to provide a reel drive disc device wherein rotational power is transmitted from the disc for driving the reel supporting disc with constant torque. Here an object is to provide a driving power transmission mechanism comprising a felt friction member and a member made of a highly wear-resistant resin such as polyethylene terephthalate, which members are pressed together in clutching operation.

Another object of the invention is to provide a reel drive disc device wherein the rotational power from the driving disc is transmitted to the reel supporting disc via a pair of mutually different transmission paths. Each path has a driving power transmission mechanism, as described above in the preceding object.

Other objects and further features of the invention will be apparent from the following detailed description when read in conjunction with the accompanying drawings.

DETAILED DESCRIPTION

Figure 1:
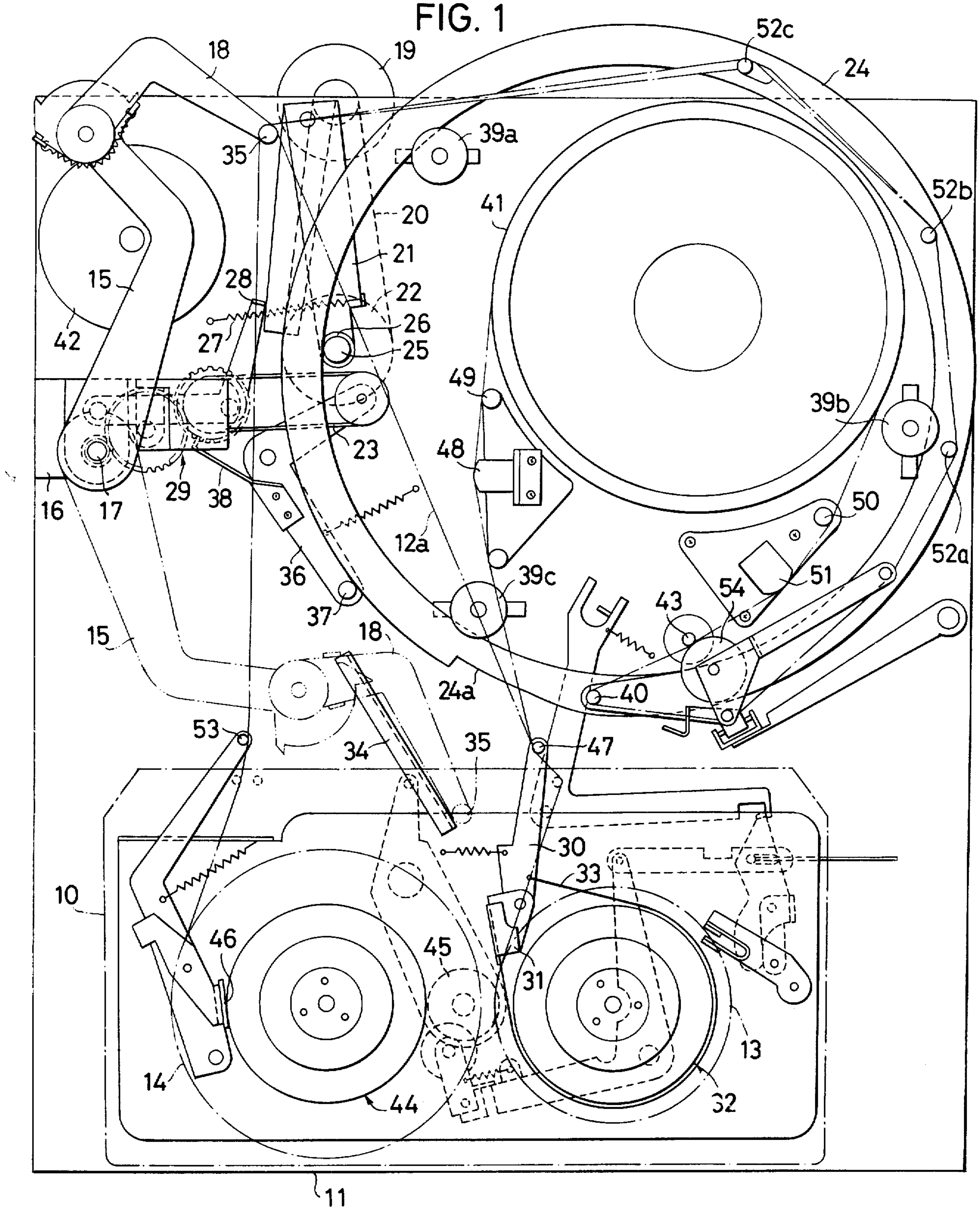
FIG. 1 is a plan view of one example of a recording-/reproducing apparatus having one embodiment of the device of the present invention.

First to be described is one example of a recording-/reproducing apparatus of an automatic tape loading type in which one embodiment of the reel drive disc device of the invention has been applied be described with reference to (FIG. 1).

In the recording/reproducing apparatus illustrated in FIG. 1, a tape cassette 10 is loaded in a specific position on the chassis 11 of the apparatus. Cassette 10 contains a supply side tape roll 13 and a take-up side tape roll 14, on which a magnetic tape 12 of ¾-inch width is wound. An L-shaped guide lever 15 is fixed at its near end to the upper end of a rotatable shaft 17 held rotatably and vertically by a holding structure 16. At its distant end, lever 15 pivotally supports one end of another L-shaped guide lever 18, which is thereby freely rotatable within a specific angular range.

When a PLAY button (not shown) of the apparatus is depressed, a motor 19 rotates for loading, Motor 19 produces an output which is transmitted by way of a belt 20 (with a clockwise rotation) to a pulley 22 rotatably supported on the distant end of the upper arm of a U-shaped lever 21, with parallel upper and lower arms. This rotation of the pulley 22 causes driving rollers 26 and 25, a belt 23, and a revolving ring 24, respectively, to rotate unitarily. The lever 21 is urged to rotate clockwise by a spring 27. When the apparatus is in the disengaged state, the lower arm of this lever 21 is caught by a bent portion of an L-shaped lever 28 and is thereby restricted in rotation. At this time, the ring driving roller 25 is separated from the inner circumferential surface of the revolving ring 24. The belt driving roller 26 is pressed against the belt 23.

Consequently, the rotation of the motor 19 is transmitted by way of the belt 20, the driving roller 26, and the belt 23 to a pulley. Then, the motor power is sent through a speed reducing mechanism 29, within the holding structure 16, to the rotatable shaft 17, which turns counterclockwise with a reduced speed.

A tension lever 30 reaches its operating position. Brake band 33 is anchored at one end to a holder 31 fixed to the chassis 11 and at the other end to a pin embeddedly fixed to the lever 30. This brake band, which surrounds the reel disc 34, is tensioned. Consequently, the servomechanism comprising the tension lever 30 and the brake band 33 functions cooperatively in an operating state.

As a result of the aforementioned rotation of the shaft 17, the L-shaped lever 15 is rotated in the counterclockwise direction from the position indicated by a two-dot chain line in FIG. 1. The L-shaped lever 18 is rotated counterclockwise, as it is rotated clockwise relative to the lever 15 and as it is guided by a guide member 34. During this operation, a guide pole 35, fixed on the free end of the lever 18, is extracted from the interior of the cassette 10, to catch the tape 12 and draw it out of the cassette. When the L-shaped levers 15 and 18 are rotated to their positions indicated by full line in FIG. 1, the tape 12 is drawn outside of the cassette and formed into a tape loop 12a of substantially triangular shape.

Furthermore, during the operation, a pin embeddedly fixed to the outer end of one arm of the L-shaped lever 28 fits into a recessed part of a cam (not shown). The cam rotates unitarily with the aforementioned shaft 17, and the lever 28 is rotated counterclockwise by a spring 27. In conjunction with this action, the U-shaped lever 21 rotates in an intercoupled manner in the clockwise direction. The driving roller 25 presses against the internal circumferential surface of the ring 24. The output rotation of the motor 10 is thereby transmitted through the driving roller 25 to the ring 24, which whereupon starts to rotate in the clockwise direction.

As the ring 24 thus starts to rotate, an L-shaped lever 36 is rotated clockwise against the force of a spring as a pin 37 fixed to the outer end of one arm of this lever 36 lifts out of a recessed portion 24*a* formed in the outer peripheral edge of the ring 24, and reaches a position of contact against the outer peripheral edge of the ring. As a consequence, the belt 23 separates from the driving roller 26. Driving power transmitted to the shaft 17 is cut off, and the revolving ring 24 thereafter revolves by itself. As a result of the clockwise rotation of the L-shaped lever 36, the outer free end of a lock lever 38 (fixed at its base part to one arm of the lever 36) enters the space between two teeth of one gear forming the speed reducing mechanism 29. The shaft 17 and L-shaped levers 15 and 18 are positively locked in their positions indicated by the full line in FIG. 1. The revolving ring 24 is rotatably supported with an inclination such that the right lower side thereof as viewed in FIG. 1, is at the lowest position by guide rollers 39*a*, 39*b*, and 39*c*.

As a result of the revolving of the ring 24, a tape guide pole 40 turning therewith advances into tape loop 12a, from its underside. Then, as this pole 58 withdraws out of this loop, it catches the tape 12. As a continuous action, in accordance with the revolving motion of the ring 24, pole 58 pulls tape 12 around the cylindrical surface of a guide drum 41. This guide drum 41 has an upper guide drum and a lower guide drum, which is fixed to the chassis 11. The upper guide drum, which is separated very slightly from the lower guide drum, contains a rotary video head exposed outwardly from its cylindrical surface. Main motor 42 rotates the upper guide drum at a high speed in the clockwise direction as viewed in FIG. 1. Similarly, a capstan 43 is rotated at a constant speed in the clockwise direction by this main motor 42. A take-up reel drive disc device 44, which constitutes an essential part of the invention, is urged to rotate counterclockwise by a drive roller 45.

When the revolving ring 24 revolves to the terminal position indicated in FIG. 1, it pulls around the tape 12. The operation of loading the magnetic tape 12 in the predetermined tape path is completed. Moreover, a pinch roller 54 is pressed against the capstan 43 with the magnetic tape interposed therebetween. A brake shoe 46 is moved to a position for contacting the reel disc device 44. The magnetic tape 12 has been drawn out of the cassette 10 from the supply side tape roll 13 within the cassette. The tape is maintained at a constant tension by the tension pole 47, and is placed in wrapping contact with an erasing magnetic head 48. Guide poles 49 and 50 wrap the tape in a helical form around a specific angular range of the cylindrical surface of the guide drum. The tape is placed in wrapping contact with an audio-control magnetic head 51, and is clamped between and driven by the capstan 43 and the pinch roller 54. The tape thus sent out from this part is inverted in its direction of advance, and is guided by guide poles 40, 52*a*, 52*b*, and 52*c* fixed to the upper face of the revolving ring 24. The tape passes by the guide pole 35, is maintained at constant takeup side tension by a tension pole 53, enters the cassette 10, and is taken up on the take-up side tape roll 14.

Next to be described is the reel disc device constituting a first embodiment of the present invention. This embodiment applies to the above auto-loading type video signal recording/reproducing apparatus which is adapted to employ a tape cassette (see FIGS. 2 through 4). In each figure, parts which are the same as those of the apparatus shown in FIG. 1 are designated by the same reference numerals.

The take-up reel disc device 44 comprises, essentially, a cylindrical bearing sleeve 61 fitted rotatably on a shaft 60 extending vertically on the chassis 11. An upper disc 62, for engaging the reel, is fixed to the bearing sleeve 61 and is prevented from being displaced upward. An intermediate disc 63 rotatably engages and drives the bearing sleeve 61, and a lower disc 64. All of these discs 62, 63, and 64 are made of phenolic resin. Between the upper disc 62 and the intermediate disc 63 and between the intermediate 63 and the lower disc 64, there are provided first and second slide clutch mechanisms 65 and 66.

The intermediate disc 63 is urged upwardly by a coil spring 68 which is interposed between the disc 63 and an engagement member 67 of annular shape, whereby the first slide clutch mechanism 65 assumes the operated state. Similarly, the lower disc 64 is urged upwardly by a coil spring 70 interposed between the disc 64 and an engagement member 69 of annular shape, whereby the second slide clutch mechanism 66 assumes the operated state. The engagement members 67 and 69 are both engaged by washers fixed to the bearing sleeve 61.

The first slide clutch mechanism 65 is so organized that the intermediate disc 63 is pressed against the upper disc 62 with a felt member 71 of annular shape interposed therebetween. This pressure is applied by means of the spring 68 having relatively great elastic force. In recording and reproducing modes, the rotation of the intermediate disc 63 is thereby directly transmitted to the upper disc 62 without slippage. This slide clutch mechanism 65 is operated when the running and stopping actions of the magnetic tape 12 occur abruptly, in the fastforward or rewinding modes wherein the intermediate disc 63 is driven. The clutch slips and prevents the magnetic tape 12 from being subjected to excessive tape-tension. The above slide clutch mechanism 65 may be comprised of the felt member 71, the upper disc 62, and a sheet member made of polyethylene terephthalate sandwiched therebetween.

Figure 4:
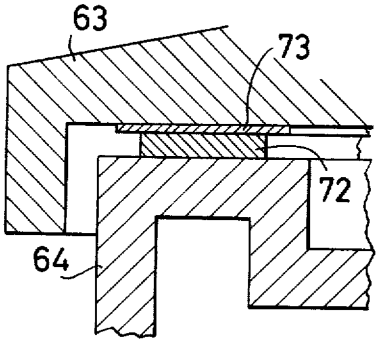
FIG. 4 is an enlarged, fragmentary elevation, in vertical section, showing the structure of driving power transmitting parts in the device shown in FIG. 2.

The second slide clutch mechanism 66 constituting an essential part of the present invention is constructed as illustrated in the enlarged view of FIG. 4. The lower disc 64 is biased, with a specific pressure, upwardly against a sheet 73 made of polyethylene terephthalate bonded to the lower surface of the intermediate disc 63 with a felt member 72 of annular shape interposed therebetween. The sheet 73 (for example a "Mylar tape" (trade mark) of the Dupont Co.) has a thickness of the order of 0.1 mm and is bonded onto the lower surface of the intermediate disc 63 by a tape having adhesive surfaces on both sides or alternatively by some appropriate adhesive. The felt member 72 contains about 90 percent wool and has a thickness in the order of 1mm. Felt 72 is bonded to the upper surface of the lower disc 64 by an adhesive or is simply pressed thereagainst by a great coefficient of friction. The felt rotates substantially unitarily with the lower disc 64.

In the take-up reel drive disc device 44, constructed as described above, the lower disc 64 is rotated at a specific speed in the counterclockwise direction responsive to the driving roller 45. The rotation of the lower disc 64 is transmitted to the intermediate disc 63 and the upper disc 62 so as to impart thereto a constant rotational torque, while slippage occurs between the contacting surfaces of the felt member 72 and the sheet 73.

The supply reel drive disc device 32 is similar to the above described take-up reel disc device 44. Drive 32 comprises an upper disc 76 fitted rotatably on a shaft, an intermediate disc 77, and a lower disc 78.

Figure 2:
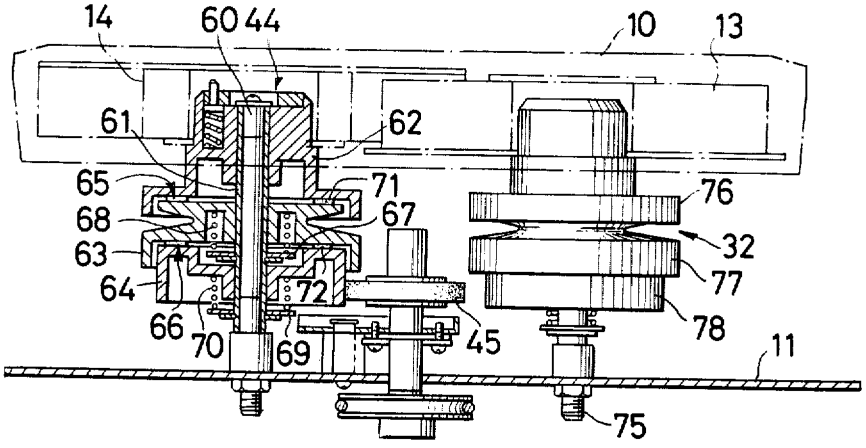
FIGS. 2 and 3 are respectively an elevation view, with a part shown in vertical section, and a plan view of a first embodiment of the reel drive disc device of the apparatus illustrated in FIG. 1.
Figure 3:
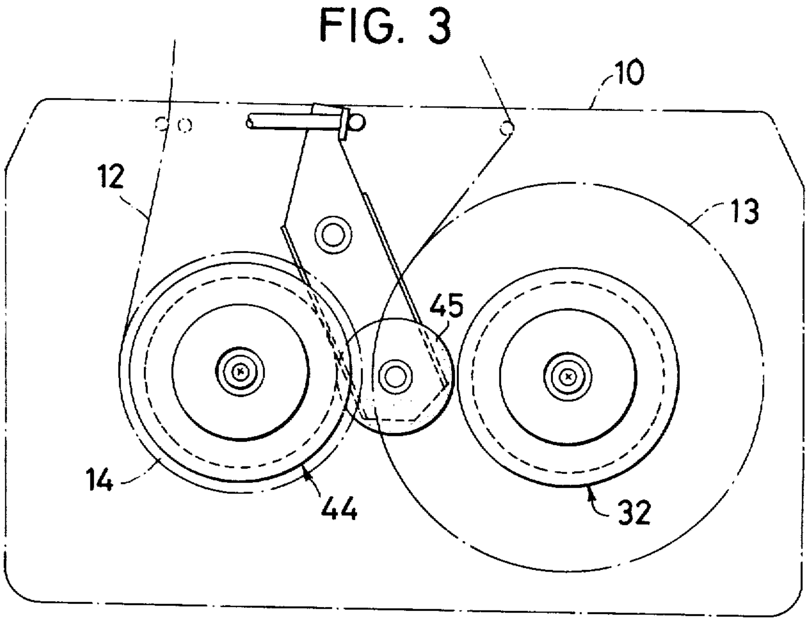

The cassette 10 is loaded in a specific position, as illustrated in FIG. 2, with a supply reel 80 and a take-up reel 81 respectively engaging the upper discs 72 and 62 of the supply and the take-up reel disc devices. The supply reel 80 and the take-up reel 81 have flanges of larger diameter at one side thereof and flanges of smaller diameter at the other side thereof. A tape roll 14 is formed with larger than the specific diameter, while in contact with the inner surface of the cassette 10.

Figure 5:
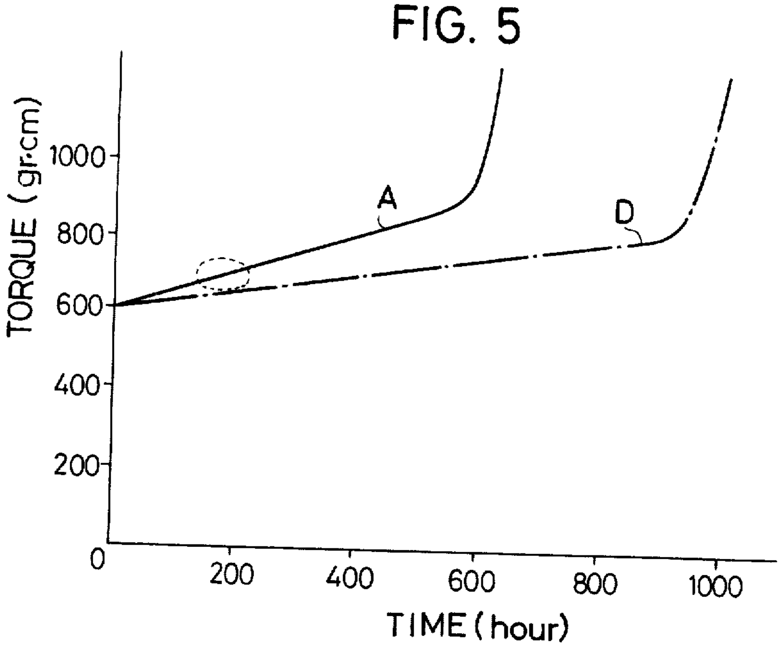
FIG. 5 is a graph indicating the variation with cumulative operational time of the torque transmitted to the reel drive-supporting disc in a conventional reel disc device as illustrated in FIG. 1.

The problems accompanying the conventional reel drive disc device will be described hereinafter particularly in conjunction with FIGS. 5 and 6. In the conventional reel drive discs device, there is no polyethylene terephthalate sheet 76 in the second slide clutch mechanism 66, as illustrated in FIG. 4. The upper surface of the felt member 72 is pressed directly against the lower surfaces of the intermediate disc 63. Accordingly, when the lower disc 64 rotates, slippage occurs between the felt member 72 and the intermediate disc 63, which is made of phenol resin. The tape take-up torque is transmitted by the sliding friction due to the slippage to the intermediate and the upper discs 63 and 62.

In order to transmit a torque of 600 gr.cm through this slide clutch mechanism, the pressing force between the driving member (i.e., the felt member 72) and the driven member (i.e., the intermediate disc 63) (is set at a relatively large value. Accordingly, during the operating period of the reel drive disc device, the phenol resin disc 63 changes, at a portion contacting the felt member 72, the properties thereof due to the heat generated by the sliding friction and the like. As a result scratched portions are formed on the felt member 72 at scattered spots (this phenomenon will hereinafter be referred to as a seizing phenomenon). The powder dropped from the phenol resin remains between the felt member 72 and the disc 63 or penetrates into the felt member 72 and thereby increases the frequency of the seizing phenomenon. The frequency of this phenomenon is kept at a very small rate during the initial operating period of the reel drive disc device, but gradually increases as the total or cumulative operating time increases. Seizing increases rapidly when the cumulative operating time exceeds approximately 600 hours.

As a result of the seizing phenomenon, the sliding friction coefficient increases between the felt member 72 and the disc 63. Therefore, in the conventional reel drive disc device, the torque imparted to the upper disc 62 for reel engagement is as illustrated in FIG. 5 by a curve A. Although torque is initially held at an appropriate value of 600 gr.cm, it gradually increases with the operating time, to about 1,000 gr.cm after the elapse of 600 hours. Thereafter torque increases rapidly with the operating time. As a result, in the cassette type VTR apparatus during the recording or reproducing mode illustrated in FIG. 1, the magnetic tape 12 which has been pulled out of the cassette 10 and loaded in the specific tape path is subjected to excessive tape tension, whereby various problems arise as described hereinbefore.

Figure 6:
FIG. 6 is an enlargement of one portion (shown within a broken line enclosure) of a curve in the graph of FIG. 5.

FIG. 6 is an enlargement of the portion of FIG. 6 which is enclosed by dotted line. The torque transmitted to the upper disc 62 increases in a stepwise manner, by little increments, with cumulative increases of operating time. In the same figure, points *a*, *b*, *c*, and *d* indicate the instants at which the seizing phenomenon occurs. When the seizing phenomenon occurs at a certain spot at a time *a*, the torque transmitted to the upper disc 69 instantaneously increases by a small amount. Thereafter, the seizing spot is smoothed off, and the above torque decreases by a very small amount. Moreover, by operating this device thereafter, the seizing phenomenon occurs again at a time *b*, at an another spot. The torque transmitted to the upper disc 62 is instantaneously increased for the second time, by a very small amount to a value which is slightly greater than the torque at the time *a*. Similarly, the seizing phenomenon occurs at times *c*, *d*, . . . with the elapse of cumulative operating time. As the frequency of the seizing phenomenon increases, the torque transmitted to the upper disc 62 increases as illustrated in FIG. 5. Moreover, when the lower surface of the intermediate disc 63 is observed through a microscope, a dropout phenomenon is observed at the seizing spots.

The operation of the reel drive disc device of the present invention, illustrated in FIG. 2, will now be described. When the cassette type VTR apparatus is changed over to the recording or reproducing mode illustrated in FIG. 1, the lower disc 42 is pressed by the driving roller 45, which is being driven by the motor 42. Disc 42 starts to rotate at a specific speed, together with the felt member 72. The rotation of the lower disc 64 is transmitted, by the sliding friction produced by the slippage between the felt member 72 and the sheet 73 made of polyethylene terephthalate resin. Rotational forces are transmitted to the intermediate disc 63 with a specific rotational torque and further to the upper disc 62 which rotates unitarily therewith. Therefore, to the takeup reel 81, the specific torque is imparted in the tape take-up direction. The magnetic tape 12 which is clamped between and driven by the capstan 43 and the pinch roller 54 is thereby wound on the take-up reel 81, as the tape roll 14, without any slack.

The sheet 73 of polyethylene terephthalate has a remarkable wear-resistance and elasticity peculiar to the resin. Further, it has properties which are not affected by the generated heat. Consequently, at the sliding frictional portions, a one-sided or unbalanced wearing phenomenon and the above seizing phenomenon rarely occur between the felt 72 and the sheet 73. The coefficient of sliding friction therebetween is held at an approximately constant value despite the increase in the cumulative operating time of the reel drive disc device. In the sliding frictional portions, as in the case of ordinary sliding frictional portions, the sliding contact portions between the felt member 72 and the sheet 73 adapt themselves to fit each other with the cumulative increase in operating time, the coefficient of the sliding friction thereby being increased. The torque transmitted from the felt member 72 to the sheet 73 is slightly increased.

Figure 7:
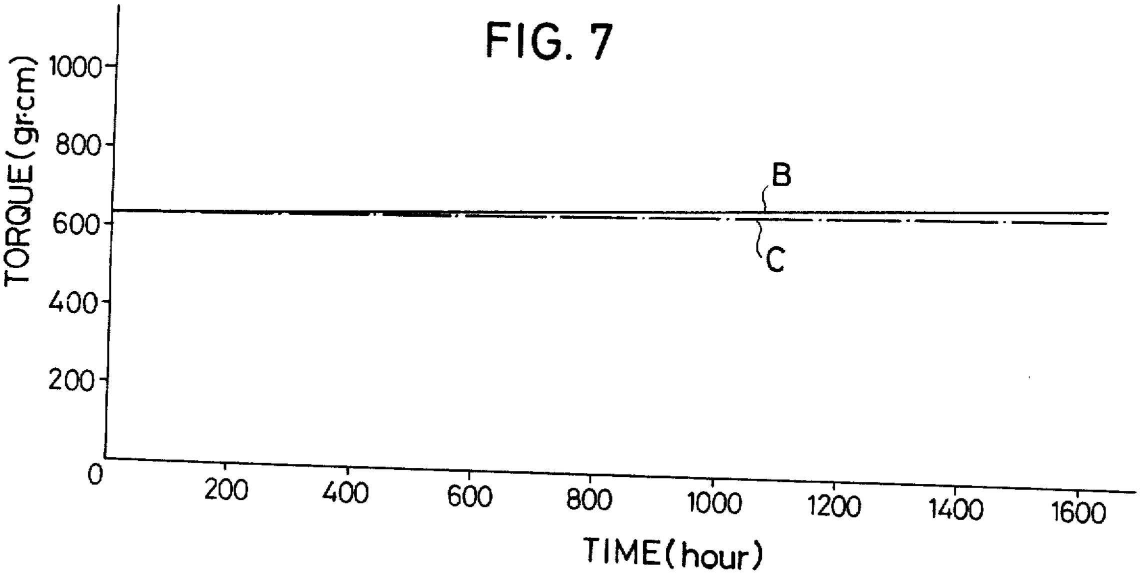
FIG. 7 is a graph indicating the variations of the torque, transmitted to the reel-supporting disc in each of the reel drive disc devices shown in FIGs. 2 and 8 with cumulative operational time of the recording/reproducing apparatus.

As a result, the relationship between the cumulative operational time of the reel drive disc device 44 and the torque transmitted to the upper disc 62 is as represented by the curve B in FIG. 7. As will be apparent from this graph, the increase in the torque transmitted to the upper disc 62 is very small with respect to the cumulative operating time of the reel drive disc device 44. Specifically, the torque value of a little over 600 gr.cm in the initial stage is, after 1,500 hours, increased by only 100 gr.cm and limited to a value of the order of 700 gr.cm.

Accordingly, in the cassette type VTR device illustrated in FIG. 1, the take-up reel drive disc device 44 of the above organization is applied, even after the cassette type VTR device is operated for a very long period of time. The take-up torque being transmitted to the upper disc 62 of the take-up reel disc device 44 is maintained at substantially the initial value. Therefore, the loading operation is never terminated in its incomplete state. Further excessive tension is never imparted to the tape, whereby normal recording or reproducing operation is continued.

Figure 8:
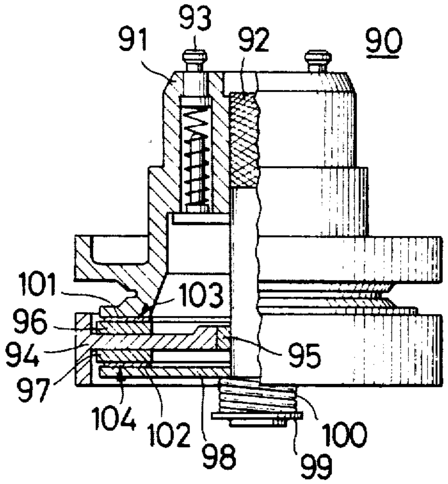
FIG. 8 is an elevation view, with one half in vertical section, of a second embodiment of a reel disc device installed in the recording/reproducing apparatus shown in FIG. 1.
Figure 9:
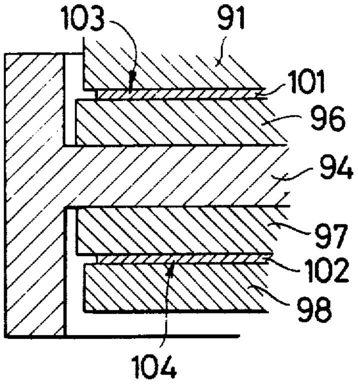
FIG. 9 is an enlarged, fragmentary elevation view, in vertical section, showing the structure of the driving power transmitting parts of the device shown in FIG. 8.

Next to be described is a reel drive disc device, constituting a second embodiment of the present invention, which is adapted to be applied to the cassette type VTR apparatus (FIGS. 8 and 9). FIG. 8 shows a reel drive disc device 90 of a parallel double-clutch type. A pair of paths are arranged for transmitting rotational power in parallel with each other. A sliding clutch mechanism is provided in each of the transmitting paths. As shown in FIG. 8, an upper disc 91 for engaging the reel is fixed to a reel shaft 92, which is mounted rotatably on a chassis (not shown). Above the upper surface of the upper disc 91 is a projecting engagement pin 93 which engages the reel of the loaded cassette.

A driving disc 94 is mounted on the reel shaft 92, by a bearing 95, such as an oil-less metal bearing or the like. Disc 94 is freely rotatable and slidable with respect to the shaft 92, and is pressed by the driving roller 45 as shown in FIG. 1, being rotated at a specific speed. Moreover, on the upper and lower surfaces of the disc 94, there are respectively provided felt members 96 and 97 of annular shape, so as to rotate unitarily therewith. A friction disc 98 is mounted on the reel disc 92, slidably in the axial direction thereof but is rotated unitarily with the shaft 92. The driving disc 94 and the friction disc 98 are subjected to an upward displacement force responsive to the expansion force of a spring 100 interposed between the disc 98 and a stopper 99.

Moreover, as illustrated in the enlarged view of FIG. 9, the lower surface of the upper disc 91 and the upper surface of the friction disc 98 respectively confront the felt members 96 and 97. Bonded sheets 101 and 102 are made of polyethylene terephthalate resin and constitute essential parts of the present invention. More specifically, one pair of contacting portions between the felt member 96 and the sheet 101 constitutes a first slide clutch mechanism 103. Another pair of contacting portions between the felt member 97 and the sheet 102 constitutes a second slide clutch mechanism 104.

The rotation of the driving disc 94 is transmitted by way of the first slide clutch mechanism 103 to the upper disc 91. At the same time, rotational driving forces are transmitted by way of the second slide clutch mechanism 104, disc 98, and reel shaft 92 to the upper disc 91. More specifically, with respect to the upper disc 91, the rotation of the driving disc 94 is transmitted along the two different transmitting paths arranged parallel to each other. Therefore, when a predetermined torque is transmitted to the upper disc 91, a rotational torque is transmitted at each of the slide clutch mechanisms 103 and 104. This torque is approximately half that of the reel drive disc device 44 of the above first embodiment.

Accordingly, the pressing force between the felt member and the sheet in each of the clutch mechanisms 103 and 104 may be limited to a value which is smaller than that of the device of the first embodiment, whereby the seizing phenomenon is further suppressed in comparison with the device of the preceding embodiment. The relationship between the cumulative operating time and the torque transmitted to the upper disc 91 is represented by the curve C shown by a one-dot chain line. The slope of this curve is less than the curve B in FIG. 7. Therefore, the tape take-up torque transmitted to the upper disc 91 is approximately the same as the initial torque value over an extremely long period (at least more than 1,600 hours).

In the conventional reel drive disc device, neither of the sheet members 101 and 102 is present in the reel disc device 90. The felt members 96 and 97 are respectively pressed against the discs 91 and 98 made of phenol resin. When operating this reel device, the seizing phenomenon occurs at two slide clutch mechanisms as in the case of the above device. The frequency of the seizing phenomenon progressively increases with the cumulative operating time of the reel disc device and rapidly increases after the cumulative operating time exceeds 900 hours. Accordingly, the relationship between the torque transmitted to the upper disc 91 and the cumulative operating time of the reel disc device is represented by the curve D shown by a one-dot chain line. As is apparent from this curve, the torque value transmitted to the upper disc 91 increases rapidly when the cumulative operating time exceeds 900 hours.

Moreover, the reel disc devices 44 and 90 of each embodiment can be constructed so that the intermediate disc 63, the upper disc 91, and the friction disc 98 are formed from polyethylene terephthalate resin, and with respect to each, the felt members 72, 96, and 97 are directly pressed. Furthermore, in the devices of each embodiment, the felt member and the polyethylene terephthalate resin sheet member are respectively provided on the driving side and the driven side. Although, contrary to this, a possible organization is where polyethylene terephthalate resin sheets are fixed onto the lower disc 64 and the driving disc 94, which constitute the driving member. The felt members are fixed onto the intermediate disc 63, the upper disc 91, and the friction disc 98, which constitute the driven member. These parts are pressed against each other.

Still further, in the above embodiment, polyethylene terephthalate resin sheets are used as the members pressed by the felt members. These sheets are not intended to be so limited. Any resin may be used if it has excellent wear-resistance with respect to the felt member, such as polyamide resins, polyethylene resins, and the like. Furthermore, sheet members can be used also if made of resin containing carbon or a resin sheet member formed in a waveform in order to reduce the sliding friction portion. In addition, ordinary paper may also be used if treated with carbon, silicon or resin such as polyethylene terephthalate resin, polyamide resin or polyethylene resin.

Further, this invention is not limited to these embodiments. Variations and modifications may be made without departing from the scope and spirit of the invention.

What is claimed is:

1. A reel disc device in a recording and/or reproducing apparatus, which device comprises:

a driven disc engaging a reel and rotating the same in a direction to take up a tape-form recording medium;

a driving disc disposed on one side of said driven disc and adapted to be rotatable as a structure separate from the driven disc;

driving means for transmitting rotational driving power to said driving disc; and rotational power transmission means operating to transmit rotational power from the driving disc to the driven disc and comprising a first friction member made of felt and adapted to rotate unitarily with either of the driven and driving discs, a second friction member made of a material having a wear resistance superior to those of phenolic resins and properties almost completely unaffected by heat generated by friction and adapted to rotate unitarily with the other of the driven and driving discs, and pressing means for pressing said first and second friction members against each other thereby to produce sliding friction resistance between said friction members whereby rotational power is transmitted from the driving disc to the driven disc.

2. A reel disc device according to claim 1 in which said second friction member comprises a resinous friction member made of a resin selected from the group consisting of polyethylene terephthalate resins, polyamide resins, and polyethylene resins.

3. A reel disc device according to claim 1 in which said second friction member comprises a paper member treated with a treatment agent selected from the group consisting of carbon, silicon, polyethylene terephthalate resins, polyamide resins, and polyethylene resins.

4. A reel disc device according to claim 1 in which said second friction member is made of a resin selected from the group consisting of polyethylene terephthalate resins, polyamide resins, and polyethylene resins all containing carbon.

5. A reel disc device according to claim 1 in which said second friction member comprises a sheet material made of a resin selected from the group consisting of polyethylene terephthalate resins, polyamide resins, and polyethylene resins and secured to said other of the discs at a position thereon confronting said felt friction member.

6. A reel disc device according to claim 1 in which said other of the disc is made of the same resin as said second friction member and functions also as said second friction member.

7. A reel disc device according to claim 1 in which said driven disc comprises a first disc driven directly only at the time of high-speed driving and a second disc disposed on one side of said first disc with a clutch mechanism adapted to slip when an excessive load is imposed thereon interposed therebetween and engaging the reel, and said rotational power transmission means is provided between the driving disc and said second disc of the driven disc.

8. A reel disc device according to claim 1 in which: said driven disc comprises a first driven disc part disposed on one side of the driving disc and a second driven disc part disposed on the side opposite to said one side of the driving disc and coupled to rotate unitarily with said first driven disc part; and said rotational power transmission means comprises first rotational power transmitting means provided between the driving disc and said first driven disc part and operating to transmit rotational power from the driving disc to the first driven disc part and a second rotational power transmitting means provided between the driving disc and said second driven disc part and operating to transmit rotational power from the driving disc to the second driven disc part.

* * * * *